(12) United States Patent
Ramesh (10) Patent No.: US 8,934,501 B2
(45) Date of Patent: Jan. 13, 2015

(54) BIDIRECTIONAL TRANSLATION OF NETWORK EDGE VIRTUALIZATION ENCAPSULATION TO CORE NETWORK VIRTUALIZATION ENCAPSULATION

(75) Inventor: Deepak Ramesh, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 282 days.

(21) Appl. No.: 13/493,985

(22) Filed: Jun. 11, 2012

(65) Prior Publication Data
US 2013/0329728 A1    Dec. 12, 2013

(51) Int. Cl.
*H04J 3/24*        (2006.01)
*H04L 12/18*    (2006.01)
(52) U.S. Cl.
CPC .. *H04L 12/18* (2013.01); *H04J 3/24* (2013.01)
USPC ............................. 370/474; 370/467; 370/390
(58) Field of Classification Search
USPC .......................... 370/389–390, 466, 467, 474
See application file for complete search history.

(56) References Cited

U.S. PATENT DOCUMENTS

| | | | |
|---|---|---|---|
| 7,783,788 B1* | 8/2010 | Quinn et al. | 710/8 |
| 2012/0177047 A1* | 7/2012 | Roitshtein | 370/392 |
| 2013/0100851 A1* | 4/2013 | Bacthu et al. | 370/254 |
| 2013/0124750 A1* | 5/2013 | Anumala et al. | 709/232 |
| 2013/0170490 A1* | 7/2013 | Kreeger et al. | 370/390 |
| 2013/0250949 A1* | 9/2013 | Farinacci et al. | 370/390 |
| 2013/0322446 A1* | 12/2013 | Biswas et al. | 370/392 |

* cited by examiner

*Primary Examiner* — Phuc Tran (57) ABSTRACT

A method, system and computer readable medium for bidirectional translation of edge network virtualization encapsulation and core network virtualization encapsulation are described. The method can include receiving a customer data frame and removing an edge network virtualization encapsulation header (e.g., VXLAN, NVGRE or VLAN header) and adding a core network virtualization encapsulation header (e.g., a MAC-in-MAC header). The customer data frame can be forwarded in a core network (e.g., an SPBm network) utilizing the core network virtualization encapsulation header, which can be translated back to an edge network virtualization encapsulation header at a receiving switch.

20 Claims, 5 Drawing Sheets

BIDIRECTIONAL TRANSLATION OF NETWORK EDGE VIRTUALIZATION ENCAPSULATION TO CORE NETWORK VIRTUALIZATION ENCAPSULATION

TECHNICAL FIELD

Embodiments relate generally to network data forwarding, and more particularly, to methods, systems and computer readable media for network edge virtualization encapsulation.

BACKGROUND

Conventional network edge virtualization encapsulation techniques such as Virtual eXtensible LAN (VXLAN) and Network Virtualization using Generic Routing Encapsulation (NVGRE) can logically extend an L2 network across L3 networks. These techniques include the addition of a header (e.g., VXLAN header) to a customer data packet and may use the L3 multicast mechanism.

SUMMARY

One embodiment includes a method for edge network virtualization encapsulation. The method can include receiving a customer data frame at a first switch, the customer data frame having a first edge network virtualization encapsulation header, and removing the first edge network virtualization encapsulation header from the customer data frame. The first switch can add a core network virtualization encapsulation header to the customer data frame, which can include multicast header information for a core network (e.g., a shortest path bridging network). The first switch can forward the message to a second switch according to a mapping obtained from the first switch.

The second switch can receive the customer data frame and remove the core network virtualization encapsulation header from the customer data frame. The second switch can add a second edge network virtualization encapsulation header to the customer data frame, and forward the customer data frame according to the second edge network virtualization encapsulation header.

Another embodiment includes a system for bidirectional translation of edge network virtualization encapsulation to core network virtualization encapsulation. The system can include a first processor coupled to a first nontransitory computer readable medium having stored thereon software instructions that, when executed by the first processor, cause the first processor to perform a first series of operations.

The first series of operations can include receiving a customer data frame at a first switch, the customer data frame having a first edge network virtualization encapsulation header, and removing the first edge network virtualization encapsulation header from the customer data frame. The first switch can add a core network virtualization encapsulation header to the customer data frame, unicast header information for a core network. The first switch can forward the message to a second switch according to a mapping obtained from the first switch.

The system can also include a second processor coupled to a second nontransitory computer readable medium having stored thereon software instructions that, when executed by the second processor, cause the second processor to perform a second series of operations.

The second series of operations can include receiving the customer data frame at the second switch, and removing the core network virtualization encapsulation header from the customer data frame. The second switch can add a second edge network virtualization encapsulation header to the customer data frame, and forward the customer data frame according to the second edge network virtualization encapsulation header.

The first switch can learn a mapping between a virtual system MAC address and physical system MAC address for a network identifier of a network associated with a sender of the customer data frame. The second switch can learn a mapping between a source of the customer data frame and the first switch for a service identifier associated with the first switch.

The first switch can include a mapping from a network identifier associated with a sender of the customer to a service identifier associated with the second switch. The mapping can be static and manually configured, or dynamic and automatically learned.

Another embodiment includes a nontransitory computer readable medium having stored thereon software instructions that, when executed by a processor, cause the processor to perform a series of operations. The operations can include receiving a customer data frame at a first switch, the customer data frame having a first edge network virtualization encapsulation header, and removing the first edge network virtualization encapsulation header from the customer data frame.

The operations can further include determining whether the customer data frame was being sent as a unicast message or a multicast message based on data in the first edge network virtualization encapsulation header. The operations can also include adding a core network virtualization encapsulation header to the customer data frame, wherein when the customer data frame was being sent as a unicast message, the core network virtualization encapsulation header includes unicast header information for a core network, and when the customer data frame was being sent as a multicast message, the core network virtualization encapsulation header includes multicast destination header information for the core network.

The operations can include forwarding the message to a second switch according to a mapping obtained from the first switch, receiving the customer data frame at the second switch, and removing the core network virtualization encapsulation header from the customer data frame.

The operations can also include adding a second edge network virtualization encapsulation header to the customer data frame and forwarding the customer data frame according to the second edge network virtualization encapsulation header.

The first switch can learn a mapping between a virtual system MAC address and a physical system MAC address for a network identifier of a network associated with a sender of the customer data frame. The second switch can learn a mapping between a source of the customer data frame and the first switch for a service identifier associated with the first switch.

In any of the embodiments described above, the edge network virtualization encapsulation can be VXLAN, NVGRE or VLAN, or any now known or later developed edge network virtualization encapsulation formats, and the core network virtualization encapsulation format can be MAC-in-MAC encapsulation or any now known or later developed core network virtualization encapsulation format.

In any of the embodiments described herein, the first switch can learn a mapping between a virtual system MAC address (or any L3 or L4 information) and both a physical system MAC address and a source IP address (and/or any other L3 or L4 information in the edge network virtualization encapsulation header) for a network identifier of a network associated with a sender of the customer data frame. The second switch can learn a mapping between a source of the customer data frame and first switch data from the core network virtualization encapsulation header for a service identifier associated with the first switch.

The first switch can include a mapping from the service identifier present in the edge network virtualization encapsulation header of the customer data frame to the service identifier in the core network virtualization encapsulation header. The mapping can be static and manually configured, or the mapping can be dynamic and automatically learned. The second switch can include a mapping from the service identifier in the core network virtualization encapsulation header to a service identifier present in the edge network virtualization encapsulation header being added to the customer data frame by the second switch. The mapping in the second switch can be static and manually configured, or the mapping can be dynamic and automatically learned.

DETAILED DESCRIPTION

In general, an embodiment can include a method, system or computer readable medium for bidirectional translation of edge network virtualization encapsulation to core network virtualization encapsulation. Edge network virtualization encapsulation can be VXLAN, NVGRE or VLAN, or any now known or later developed edge network virtualization encapsulation formats.

A core network, such as a shortest path bridging network (e.g., SPB, SPBm or the like) can utilize a core network virtualization encapsulation header, such as MAC-in-MAC. As used herein, MAC-in-MAC encapsulation refers to provider backbone bridges, which have been standardized as IEEE 802.1ah-2008. While example embodiments are described in reference to a MAC-in-MAC header, it will be appreciated that other now known or later developed outer (or encapsulating) header formats compatible with an SPBm network (or the like) could be used.

Figure 1:
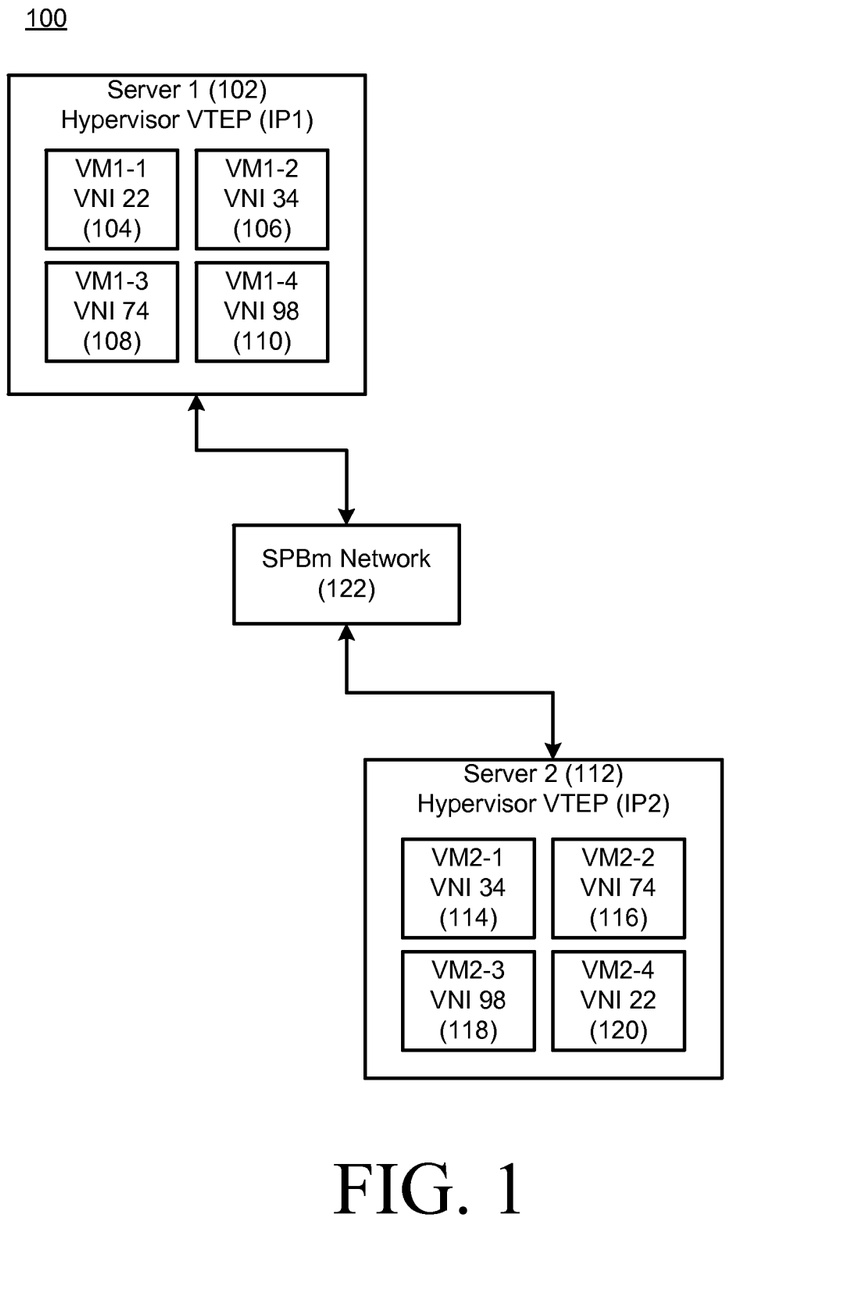
FIG. 1 is a diagram of an example network in accordance with at least one embodiment.

As shown in FIG. 1, a network 100 includes a first physical server 102 having a plurality of virtual machines (104-110) and a second physical server 112 having a plurality of virtual machines (114-120). As shown in FIG. 1, the servers are connected via an SPBm network 122. Embodiments permit translation of edge network virtualization encapsulation to core network virtualization encapsulation and forwarding over the SPBm network using MAC-in-MAC encapsulation.

Some conventional techniques (e.g., VXLAN and NVGRE) propose to use an IP network as the core network to carry the encapsulated (VXLAN, NVGRE and VLAN) packets. The conventional proposals may rely on the IP multicast mechanism of a core network to handle broadcast, unknown unicast and multicast traffic. Using the IP multicast mechanism can involve running IP multicast protocols such as Protocol Independent Multicast (PIM) in the L3 core, which can be a complex solution.

In contrast to the conventional techniques, embodiments can include using an SPBm based L2 network as the underlying network. The SPBm network provides a simpler multicast mechanism that can carry both known and unknown unicast and multicast traffic for VXLAN and NVGRE encapsulated packets.

Regarding multicast traffic in an SPBm network, IEEE standard 802.1aq specifies how the transit backbone bridges need to forward the packets efficiently based on the multicast backbone destination address in the message. In an SPBm network, message replication happens on the backbone bridges only if there are receivers in the downstream path. The SPBm standard specifies how these efficient multicast trees are built based on the ISID. The edge network virtualization encapsulation technique described herein makes use of these efficient multicast trees built based on the SPBm standard for forwarding messages to multiple receivers in the SPBm network.

In addition to simplifying the multicast mechanism, embodiments can include an SPBm header having a reduced size compared to the VXLAN header. For example, a VXLAN header can be 54 bytes in length, while an SPBm header is only 22 bytes.

Figure 2:
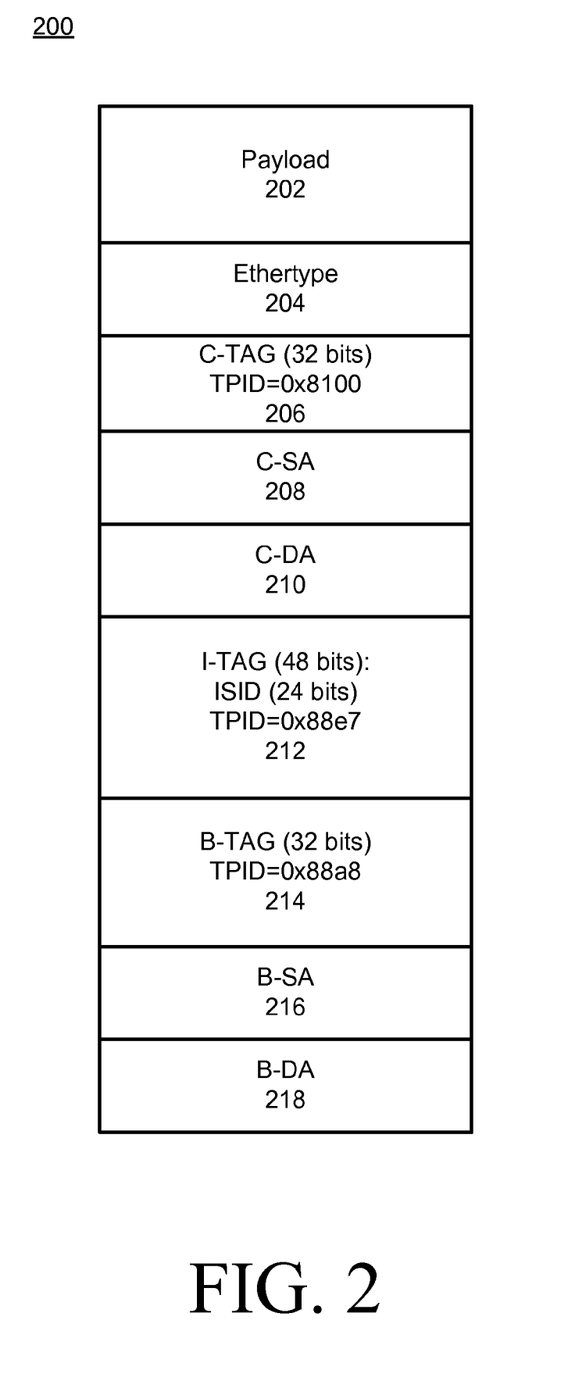
FIG. 2 is a header diagram illustrating MAC-in-MAC encapsulation in accordance with at least one embodiment.

FIG. 2 is a block diagram of an example data frame 200 according to IEEE Standard 802.1ah (or MAC-in-MAC encapsulation). The data frame 200 includes a payload 202, ethertype 204, a tag protocol identifier (CTAG/TPID) 206, a customer source address (C-SA) 208 and a customer destination address (C-DA) 210. The data frame also includes a MAC-in-MAC header having an I-TAG 212, a B-TAG 214 (which can include a backbone VLAN ID), a backbone source address (B-SA) 216 and a backbone destination address (B-DA) 218. A service identifier (or ISID) comprises 24 bits of the I-TAG 212. As shown in FIG. 2, the customer data frame (e.g., 202-210) can remain original and unmodified, and the MAC-in-MAC header (212-218) can be added and used for forwarding the customer data frame without a need to alter the customer data frame.

Figure 3:
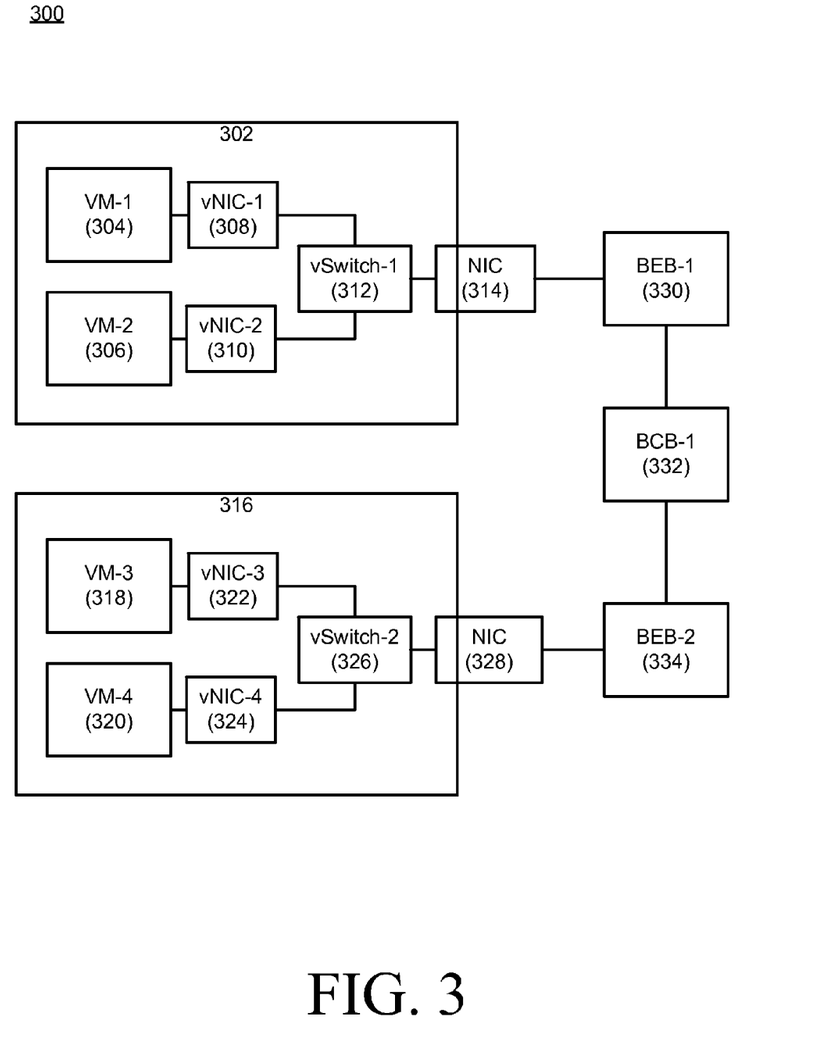
FIG. 3 is a diagram of a network showing details of a forwarding example in accordance with at least one embodiment.

FIG. 3 shows a network 300 including a first server 302 having two virtual machines (304 and 306) each coupled to a respective one of the two virtual NICs (308 and 310, respectively). The virtual NICs are coupled to a virtual switch 312 and then to a physical NIC 314.

A second server 316 includes two virtual machines (318, 320) each coupled to one of the two virtual NICs (322 and 324, respectively). The virtual NICs are coupled to a virtual switch 326 and then to a physical NIC 328.

The NIC 314 couples the first server 304 to a first backbone edge bridge (BEB-1, 330). BEB-1 is connected to a backbone core bridge (BCB-1) 332. The NIC 328 couples the second server 316 to a second backbone edge bridge (BEB-2, 334), which is connected to the BCB-1 332.

The first server 302 can have an IP address (IP-1) and a MAC address (M1) and the second server 316 can have an IP address (IP-2) and a MAC address (M2).

Figure 4:
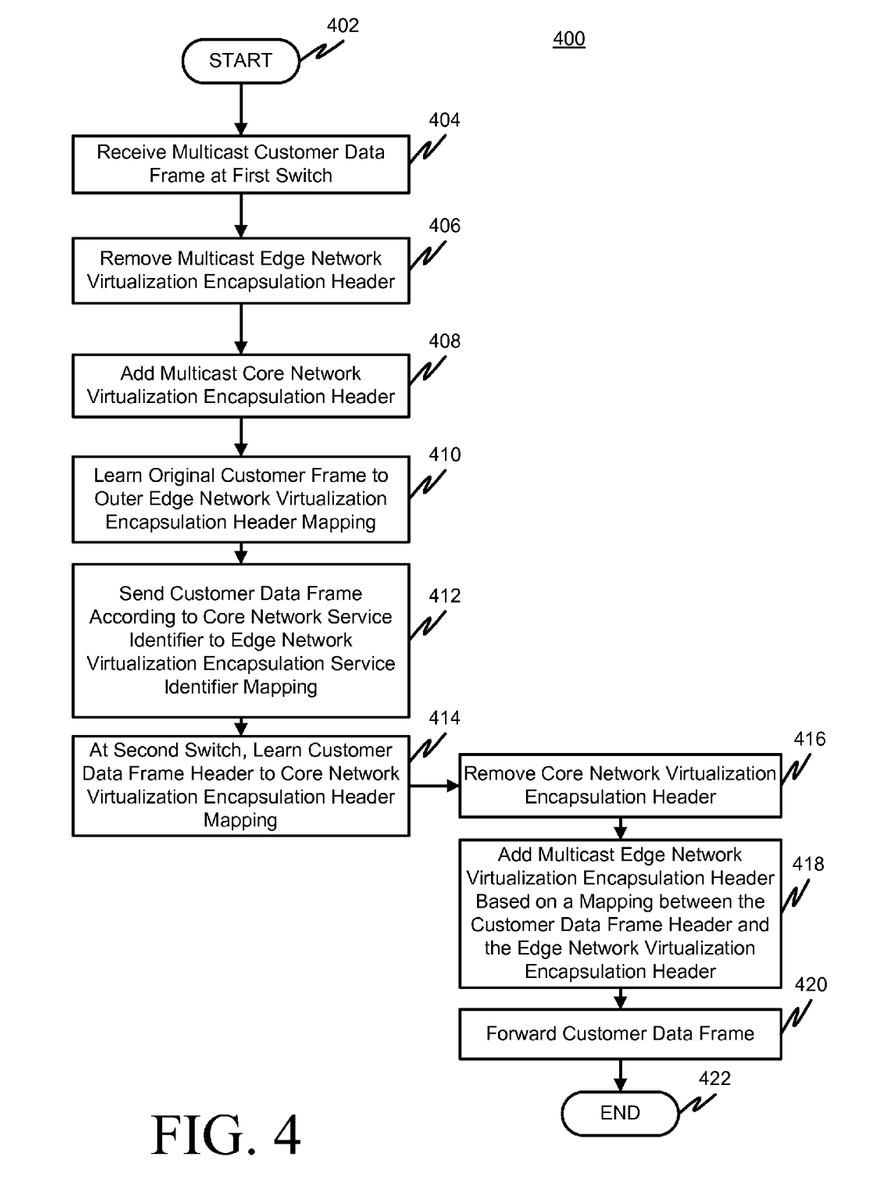
FIG. 4 is a flow chart showing an example edge network virtualization encapsulation multicast method in accordance with at least one embodiment.
Figure 5:
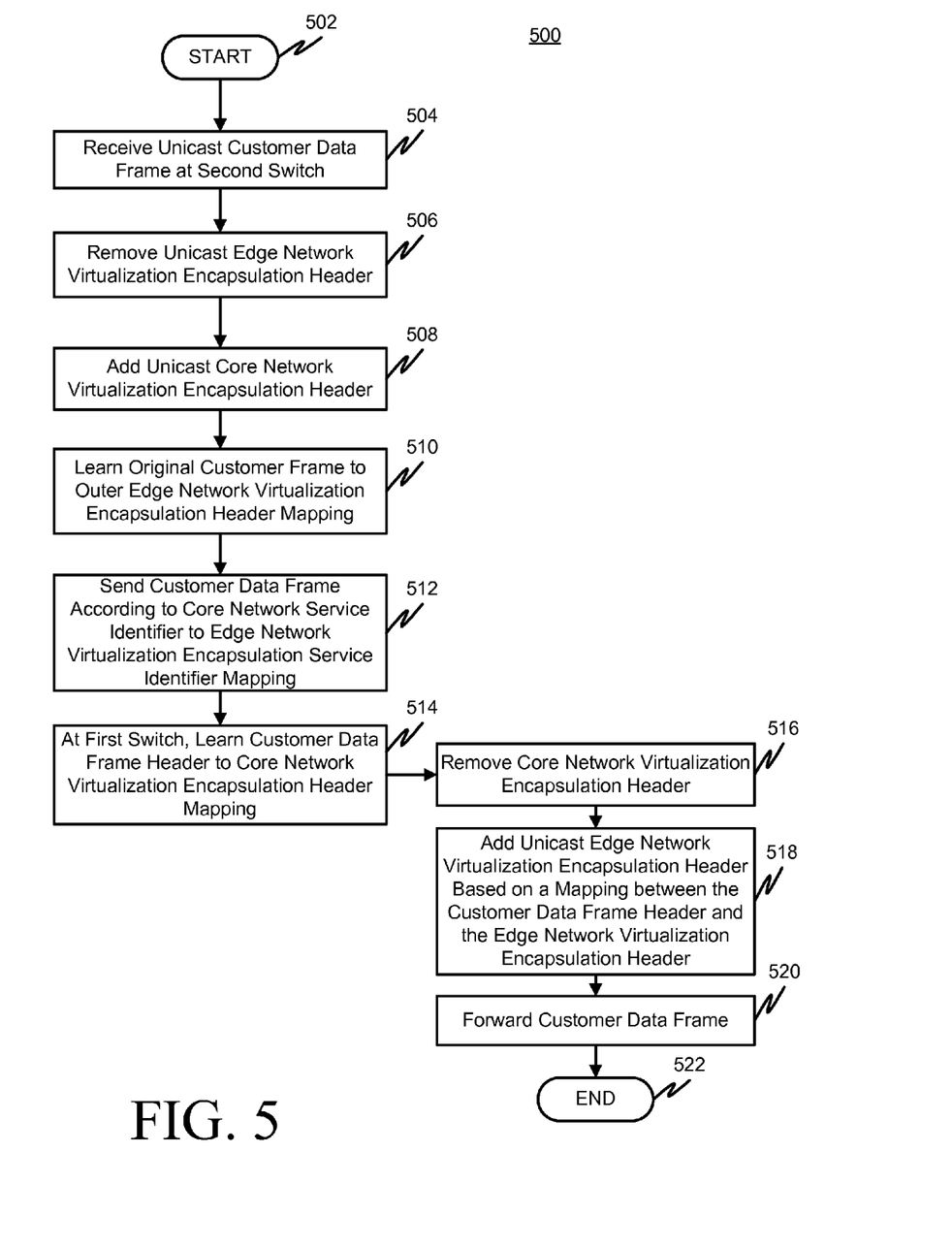
FIG. 5 is a flow chart showing an example edge network virtualization encapsulation unicast method in accordance with at least one embodiment.

FIGS. 4 and 5 show flowcharts of example methods of edge network virtualization encapsulation. For purposes of illustrating example systems and structural elements, FIG. 3 can serve as a reference for the description below regarding FIGS. 4 and 5. In FIG. 4, a multicast frame is sent from a first virtual machine (e.g., VM-1) through a first switch (e.g., BEB-1) and a second (e.g., BEB-2) to a second virtual machine (e.g., VM-4). In FIG. 5, a unicast message is sent from the second virtual machine (e.g., VM-4) to the first virtual machine (e.g., VM-1).

As shown in FIG. 4, a process starts at 402 and continues to 404.

At 404, a multicast customer data frame is received at a first switch (e.g., BEB-1, 330). Prior to the customer data frame being received at the first switch, vSwitch-1 (312) gets an ARP request packet from VM-1 304 with a source IP of VM-1's IP and a destination IP of VM-4. A VXLAN (or NVGRE) header can be added by vSwitch-1 with the outer MAC as the multicast destination MAC and the outer IP as a multicast IP for the given VNI. vSwitch-1 may have a mapping between VMs and VNIs via configuration.

At 406, the first switch removes the multicast edge network virtualization encapsulation header (e.g., the VXLAN, NVGRE or VLAN header).

At 408, the first switch adds a multicast MAC-in-MAC header (or other core network encapsulation header) to the customer data frame.

At 410, the first switch learns a mapping from the original customer frame to the outer edge network virtualization encapsulation header, i.e., a mapping between the inner source MAC (e.g., VM-1's MAC) and an outer source IP (IP-1 for server 302) and an outer source MAC (M1 for server 302).

At 412, the customer frame is sent (or forwarded) as a multicast message with the MAC-in-MAC encapsulation according to a mapping from a core network service identifier to an edge network virtualization encapsulation service identifier. The mapping can be static and manually configured or dynamic and automatically learned.

At 414, the customer data frame (now with a MAC-in-MAC header, for example) is received at a second switch (e.g., BEB-2, 334). The second switch learns a mapping from the customer data frame header to a core network virtualization encapsulation header (e.g., the second switch can learn that the inner source MAC for VM-1 is reachable via BEB-1 for the ISID being used).

At 416, the MAC-in-MAC (or other core network virtualization encapsulation) header is removed.

At 418, an edge network virtualization encapsulation header (e.g., VXLAN, NVGRE or VLAN) header is added to the customer data frame. The header is based on a mapping between the customer data frame header and the edge network virtualization encapsulation header (e.g., the destination MAC in the inner header is a multicast MAC, so the second switch 334 can build a multicast VXLAN header and send (420) the customer data frame on to vSwitch-2 326). Processing ends at 422. It will be appreciated that 404-420 can be repeated in whole or in part.

vSwitch-2 326 can provide the customer data frame to all VMs belonging to the VNI. For example, VM-4 may be responding to this customer data frame. vSwitch-2 326 can make an entry for mapping an inner MAC of VM-1 with an outer source IP (IP-1) and an outer source MAC (M1).

FIG. 5 is a flowchart of a unicast packet response from VM-4 320 to VM-1 304. Processing begins at 502.

At 504, a second switch (e.g., BEB-2 334), receives a unicast customer data frame. Prior to sending the customer data frame, vSwitch-2 326 may have received a response from VM-4 320 with a source IP as VM-4's IP and destination IP as VM-1's destination IP. vSwitch-2 326 already has information stored matching VM-1's MAC address with the outer destination IPS (IP1) and the outer destination MAC (M1).

vSwitch-2 adds a VXLAN header with outer MAC as destination MAC and outer IP as the IP for the given VNI. The second switch has a VM to VNI mapping stored.

At 506, the unicast edge network virtualization encapsulation header (e.g., VXLAN header) is removed.

At 508, a unicast core network virtualization encapsulation header (e.g., a MAC-in-MAC header) is added.

At 510, the second switch learns a mapping between the original customer data frame header and an outer edge network virtualization encapsulation header (e.g., that VM-4's MAC is associated with an outer IP [IP-2] and outer MAC [M2] for this VNI).

At 512, the customer data frame is sent as a unicast packet having MAC-in-MAC encapsulation according to a mapping between a core network virtualization encapsulation service identifier and an edge network virtualization encapsulation service identifier.

At 514, the customer data frame is received at the first switch 302 and the first switch 302 learns a mapping between the customer data frame header and a core network virtualization encapsulation header.

At 516, the first switch removes the core network virtualization encapsulation header (e.g., the MAC-in-MAC header) from the message.

At 518, a unicast edge network virtualization encapsulation header is added based on a mapping between the customer data frame header and the edge network virtualization encapsulation header.

At 520, the customer data frame is forwarded. Processing ends at 522. It will be appreciated that 504-520 can be repeated in whole or in part.

Based on VNI and a unicast inner destination MAC in the customer data frame, vSwitch-1 provides the data frame to VM-1 only. vSwitch-2 makes entries for mapping the inner MAC of VM-4 against an outer source IP (IP-2) and an outer source MAC (M2).

It will be appreciated that the modules, processes, systems, and sections described above can be implemented in hardware, hardware programmed by software, software instructions stored on a nontransitory computer readable medium or a combination of the above. A system for edge network virtualization encapsulation, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for edge network virtualization encapsulation.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method for bidirectional translation of edge network virtualization encapsulation to core network virtualization encapsulation, the method comprising:
   receiving a multicast customer data frame at a first switch, the customer data frame having a first multicast edge network virtualization encapsulation header;
   removing the first multicast edge network virtualization encapsulation header from the customer data frame;
   adding a multicast core network virtualization encapsulation header to the customer data frame;
   forwarding the message to a second switch according to a mapping obtained from the first switch, wherein the mapping includes a virtual system MAC address and a physical system MAC address for a network identifier of a network associated with a sender of the customer data frame;
   receiving the customer data frame at the second switch;
   removing the multicast core network virtualization encapsulation header from the customer data frame;
   adding a second multicast edge network virtualization encapsulation header to the customer data frame; and
   forwarding the customer data frame according to the second multicast edge network virtualization encapsulation header.

2. The method of claim 1, further comprising:
   learning, at the first switch, a mapping between a header of the customer data frame and an outer edge network virtualization encapsulation header associated with a sender of the customer data frame.

3. The method of claim 1, further comprising:
   learning, at the second switch, a mapping between a source of the customer data frame and first switch data from the core network virtualization encapsulation header for a service identifier associated with the first switch.

4. The method of claim 1, wherein the edge network virtualization encapsulation header includes a VXLAN header, and the core network virtualization encapsulation header includes a MAC-in-MAC encapsulation header.

5. The method of claim 1, wherein the edge network virtualization encapsulation header includes a NVGRE header, and the core network virtualization encapsulation header includes a MAC-in-MAC encapsulation header.

6. The method of claim 1, wherein the first switch includes a mapping from a service identifier present in the edge network virtualization encapsulation header of the customer data frame to a service identifier in the core network virtualization encapsulation header.

7. The method of claim 6, wherein the mapping is static and is manually configured.

8. The method of claim 6, wherein the mapping is dynamic and is automatically learned.

9. A system comprising:
   a first processor coupled to a first nontransitory computer readable medium having stored thereon software instructions that, when executed by the first processor, cause the first processor to perform a first series of operations, the first series of operations including:
      receiving a unicast customer data frame at a first switch, the customer data frame having a first unicast edge network virtualization encapsulation header;
      removing the first unicast edge network virtualization encapsulation header;
      adding a unicast core network virtualization encapsulation header to the customer data frame;
      forwarding the message to a second switch according to a mapping obtained from the first switch, wherein the mapping includes a virtual system MAC address and a physical system MAC address for a network identifier of a network associated with a sender of the customer data frame; and a second processor coupled to a second nontransitory computer readable medium having stored thereon software instructions that, when executed by the second processor, cause the second processor to perform a second series of operations, the second series of operations including:

receiving the customer data frame at the second switch;

removing the unicast core network virtualization encapsulation header from the customer data frame;

adding a second unicast edge network virtualization encapsulation header to the customer data frame; and forwarding the customer data frame according to the second edge network virtualization encapsulation header.

10. The system of claim 9, wherein the first series of operations further comprises:

learning, at the first switch, a mapping between a header of the customer data frame and an outer edge network virtualization encapsulation header associated with a sender of the customer data frame.

11. The system of claim 9, wherein the second series of operations further comprises:

learning, at the second switch, a mapping between a source of the customer data frame and first switch data from the core network virtualization encapsulation header for a service identifier associated with the first switch.

12. The system of claim 9, wherein the edge network virtualization encapsulation header includes a VXLAN header, and the core network virtualization encapsulation header includes a MAC-in-MAC encapsulation header.

13. The system of claim 9, wherein the edge network virtualization encapsulation header includes a VLAN header, and the core network virtualization encapsulation header includes a MAC-in-MAC encapsulation header.

14. The system of claim 9, wherein the first switch includes a mapping from a service identifier present in the edge network virtualization encapsulation header of the customer data frame to a service identifier in the core network virtualization encapsulation header.

15. The system of claim 14, wherein the mapping is static and is manually configured.

16. The system of claim 14, wherein the mapping is dynamic and is automatically learned.

17. A nontransitory computer readable medium having stored thereon software instructions that, when executed by a processor, cause the processor to perform a series of operations comprising:

receiving a customer data frame at a first switch, the customer data frame having a first edge network virtualization encapsulation header;

removing the first edge network virtualization encapsulation header;

determining whether the customer data frame was being sent as a unicast message or a multicast message based on the first edge network virtualization encapsulation header;

adding a unicast core network virtualization encapsulation header to the customer data frame when the customer data frame was being sent as a unicast message;

adding a multicast core network virtualization encapsulation header to the customer data frame when the customer data frame was being sent as a multicast message;

forwarding the message to a second switch according to a mapping obtained from the first switch, wherein the mapping includes a virtual system MAC address and a physical system MAC address for a network identifier of a network associated with a sender of the customer data frame;

receiving the customer data frame at the second switch;

removing, at the second switch, the core network virtualization encapsulation header;

adding an edge network virtualization encapsulation header to the customer data frame; and forwarding the customer data frame according to the edge network virtualization encapsulation header.

18. The nontransitory computer readable medium of claim 17, wherein the operations further comprise:

learning, at the first switch, a mapping between a header of the customer data frame and an outer edge network virtualization encapsulation header associated with a sender of the customer data frame.

19. The nontransitory computer readable medium of claim 17, wherein the operations further comprise:

learning, at the second switch, a mapping between a source of the customer data frame and first switch data from the core network virtualization encapsulation header for a service identifier associated with the first switch.

20. The nontransitory computer readable medium of claim 17, wherein the edge network virtualization encapsulation header includes a VXLAN header, and the core network virtualization encapsulation header includes a MAC-in-MAC encapsulation header.

* * * * *